April 18, 1961   C. MOSSHART ET AL   2,980,571
METHOD OF MAKING A DIAPHRAGM FOR FLUID SPRING
Filed Aug. 4, 1958   2 Sheets-Sheet 1

INVENTOR.
CROCKETT MOSSHART
GERALD O. EDGERLY
BY RUSSELL R. ECCLESTON
ALFRED W. SEAR

ATTORNEY.

April 18, 1961   C. MOSSHART ET AL   2,980,571
METHOD OF MAKING A DIAPHRAGM FOR FLUID SPRING
Filed Aug. 4, 1958   2 Sheets-Sheet 2
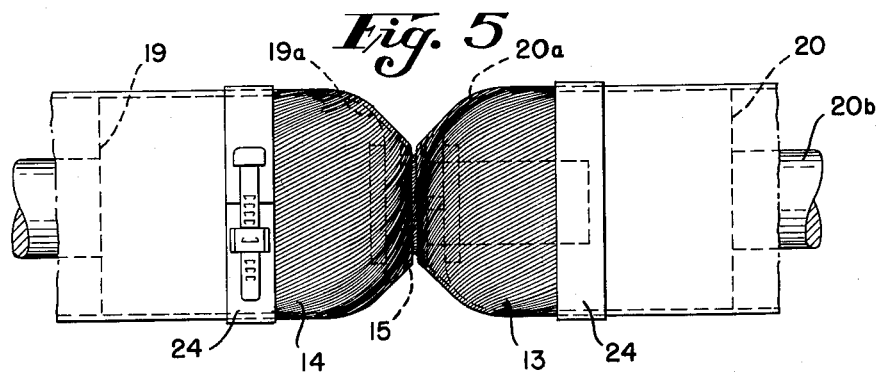
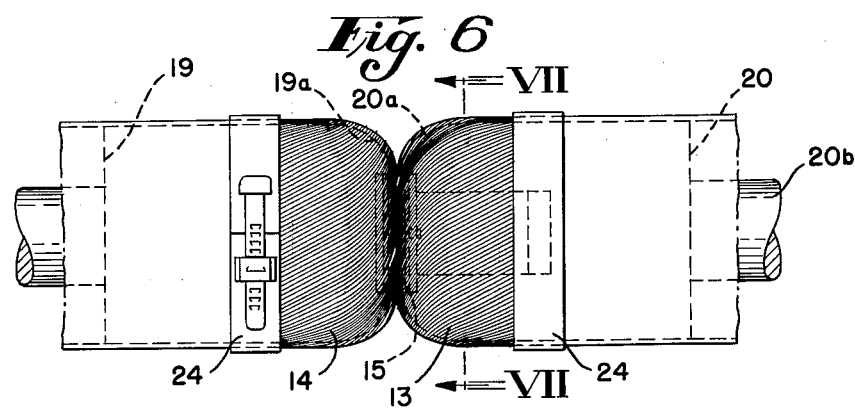
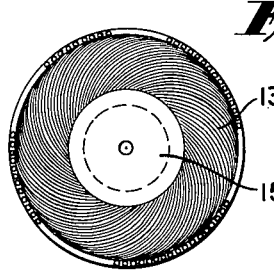
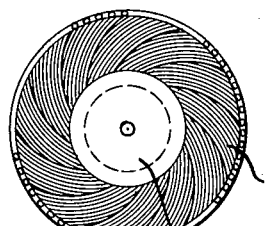
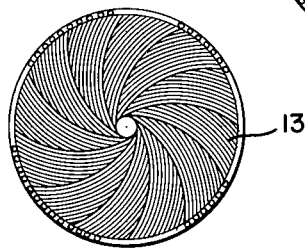
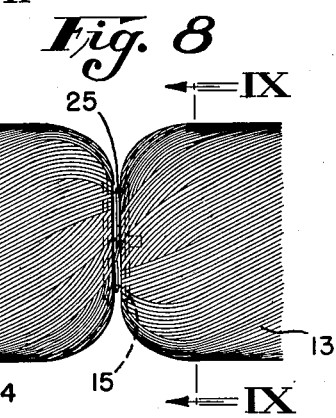
INVENTOR.
CROCKETT MOSSHART
GERALD O. EDGERLY
BY RUSSELL R. ECCLESTON
ALFRED W. SEAR
ATTORNEY.

United States Patent Office 2,980,571
Patented Apr. 18, 1961

2,980,571

METHOD OF MAKING A DIAPHRAGM FOR FLUID SPRING

Crockett Mosshart, Detroit, Mich., Gerald O. Edgerly, Indianapolis, Ind., and Russell R. Eccleston, Detroit, and Alfred W. Sear, Mount Clemens, Mich., assignors to United States Rubber Company, New York, N.Y., a corporation of New Jersey Filed Aug. 4, 1958, Ser. No. 752,788

14 Claims. (Cl. 154—81)

This invention relates to the art of diaphragms, and more specifically, to an improved method of making a flexible diaphragm for use in fluid springs.

The diaphragm of this invention is useful in various environments and is especially useful as an element of a fluid spring of the controlled area type, including a cylinder, a piston and a flexible diaphragm which connects the piston to the cylinder. In this type of spring, the diaphragm is turned inside out in the course of a full stroke of the piston and, as a consequence, the extent to which the diaphragm can be so reversed places a limitation upon the stroke of the piston, which in turn, affects the performance of the fluid spring suspension.

The type of diaphragm required for such operation, and with which this invention is concerned, generally comprises a flexible tubular member having one end of substantially greater circumference than the other, the larger end being connected to the cylinder and the smaller end to the piston. The tubular member is made from a strip of cord fabric that is coated with a flexible fluid-impermeable composition such as rubber, the strip being formed into a tube or pocket which is folded intermediate its ends in a manner to obtain two relatively superimposed and substantially coextensive tubular plies.

However, in prior art methods of making such a diaphragm, the tube is formed to a diameter substantially corresponding to that of the smaller end of the diaphragm, and then the ends of the tube are expanded to a diameter substantially corresponding to that of the larger end of the diaphragm. In practicing such methods it has been found disadvantageous to construct such diaphragms wherein the larger end is more than 3.5 times greater than the smaller end. As a result, for a given diaphragm, the stroke of the piston and the performance of the fluid spring is necessarily limited. Examples of such prior art development may be found by referring to the disclosures of the following copending applications: D. R. Elliott et al., Serial No. 495,534, filed March 21, 1955, now Patent No. 2,901,242, and entitled "Fluid Spring"; W. E. Harris et al., Serial No. 643,297, filed March 1, 1957, and entitled "Diaphragm for Fluid Springs and Method and Apparatus for Making the Same"; and G. O. Edgerly et al., Serial No. 643,470, filed March 1, 1957, and entitled "Diaphragm for Fluid Springs and Method of Making the Same."

Accordingly, it is the principal object of this invention to provide an improved method of making a diaphragm so that when such a diaphragm is used in a fluid spring of the character indicated, it substantially improves the performance of the spring by substantially extending the effective stroke of the piston therein. Briefly, this object is attained by making the smaller end of the diaphragm arbitrarily small in relation to its larger end, thereby substantially increasing the effective reversible length thereof.

This, as well as other objects and advantages of the invention will become apparent upon consideration of the following detailed description and the accompanying drawings, wherein:

Fig. 5 is an elevational view of the second step;

Fig. 6 is an elevation showing a further step in forming the small bead portion;

Fig. 7 is a transverse sectional view taken on line 7—7 of Fig. 6, with the mandrel removed to show the direction of the cords of the completed form of the small bead portion;

Fig. 8 is a fragmentary elevational view of a processed tube or pocket showing a modification of the preferred form of the invention;

Fig. 9 is a transverse section, taken on line 9—9 of Fig. 8 showing the overlapping and cord direction of the tube in the modified form of the small bead portion of Fig. 8; and Fig. 10 is a transverse sectional view of another modification similar to Fig. 9, but wherein the disc is omitted and the small bead portion is made by the overlapping cords of the fabric.

Figure 1:
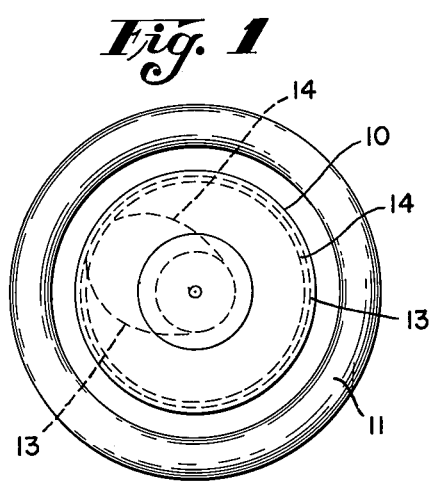
Fig. 1 is a plan view of a diaphragm constituting a preferred embodiment of the invention, and incorporating a small and a large bead portion at opposite ends.
Figure 2:
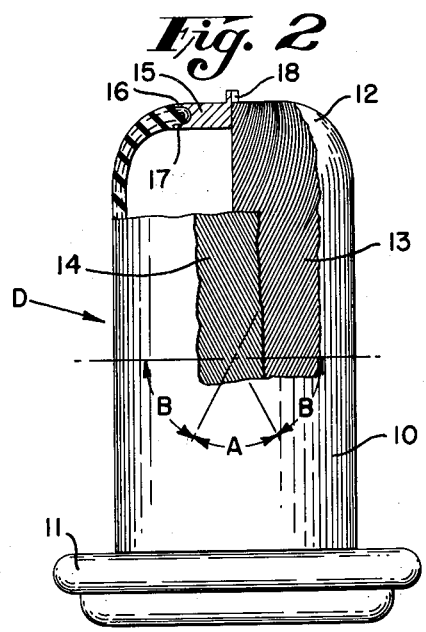
Fig. 2 is an elevation of the diaphragm shown in Fig. 1, with parts broken away to show the cord direction of the plies, and the manner in which the plies are folded at the small bead portion.
Figure 3:
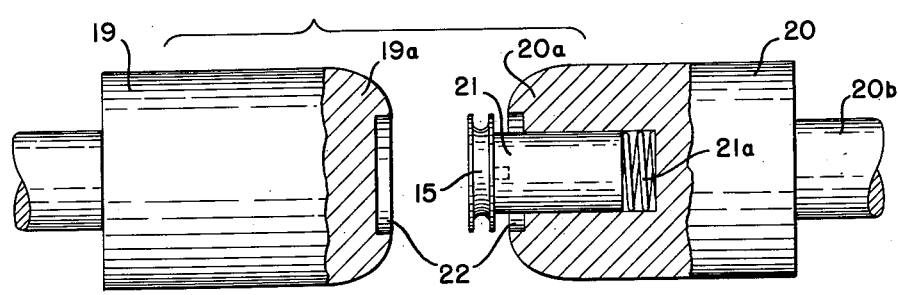
Fig. 3 is an elevation, partially in section, of the means, for constructing the preferred form of the small bead portion shown in Figs. 1 and 2.

Referring to the drawings, Figs. 1 and 2 illustrate a generally cylindrical type diaphragm constructed in accordance with the preferred form of the invention. The completed diaphragm D comprises a flexible tubular member 10 having an outwardly flared, large diameter bead portion 11 at one end, for connection to the cylinder of the fluid spring (not shown), and an inwardly flared, small diameter bead portion or end closure 12 at the other end. These bead portions are composed of and interconnected by an outer ply 13 and inner ply 14 of cord fabric which have been impregnated with a fluid-impermeable composition such as rubber. The bead portion 12 is closed by means of a circular metal disc 15 provided with end flanges 16 and 17, between which the plies are folded along a continuous fold line into superimposed and substantially coextensive relationship. The disc 15 is also provided with a pilot pin 18, or a hold (not shown), which may be used for concentrically locating the disc during the forming of the closure 12, depending upon the mechanical means (not shown) for attaching the ends of the diaphragm in the fluid spring assembly (not shown).

As will be explained more in detail below, the bead portion 12 is contracted and flared arcuately inwardly in engagement with disc 15, which may be of any desired diameter smaller than that of tubular member 10. Thus, for any given diameter of large bead portion 11, and for any given length of tubular member 10, measured from bead portion 11 to the point at which bead portion 12 begins to flare inwardly, the effective reversible length of diaphragm D, which is measured from bead portion 11 to the inner diameter of bead portion 12 is substantially increased as the smaller bead portion 12 is flared inwardly. Accordingly, regardless of the size of the piston (not shown) which is attached to pin 18 of disc 15 (it being obvious that sufficient radial clearance must be provided between the piston and tubular member 10 for reversing the member within itself), the effective piston stroke is likewise increased, thereby improving the performance of the fluid spring. On the other hand, where space is at a premium, the piston length, the tubular member length and spring length may be decreased, while maintaining the same effective reversible diaphragm length, and thus, the same effective piston stroke. In an automobile or bus, for example, this increased springing action provides a softer ride, particularly under heavy load and/or over rough roads.

As also seen in Figs. 1 and 2, the cords of the superimposed fabric plies 13 and 14 extend from one end of diaphragm D to the other, with the individual cords of ply 14 extending across the individual cords of ply 13 at an included angle A of between 30° and 150°, but preferably between 70° and 100°. Expressed in terms commonly used in the diaphragm and related fields, the cords of the individual plies are alternately laid in different directions at a "cord angle" B of between 15° and 75°, but preferably between 40° and 55°; the term "cord angle" being defined as the angle between the individual cords and a plane perpendicular to the surface of the plies and through a line tangential to and in the plane of a circumferential line of said surface.

The disposition of the individual cords of plies 13 and 14 provides a restraint against lateral movement of tubular member 10 so that it may readily be reversed within itself without danger of being pinched or damaged, as any lateral movement thereof immediately imposes tension on a number of the cords, whereby such lateral movement is restained. While the maximum permissible range for angle A or the "cord angle," noted above, provides satisfactory performance, it has been found that the minimum range specified produces the best results, and is therefore preferred.

Referring to Figs. 3, 4, 5 and 6, the progressive steps for making smaller bead portion 12 by the preferred method, will now be described. A pair of movable mandrels 19 and 20, having rounded ends 19a and 20a, respectively, are located in spaced, axially aligned relation to each other for receiving disc 15. The disc is concentrically positioned on the projecting portion of a shaft 21 of mandrel 20, the shaft being projected from mandrel 20 by means of a light weight compression spring 21a. Shaft 21 is free to rotate and move longitudinally in mandrel 20 during the series of operations involved in forming bead portion 12, and each mandrel has a circumferential recess 22 for partially receiving disc 15 during a subsequent operation hereinafter to be described.

The movement of the mandrels referred to above is mechanically controlled in such a way that mandrel 19 may be held stationary or moved toward or away from mandrel 20, as by means of a fluid-operated piston and air cylinder (not shown), while mandrel 20 may be simultaneously rotated and/or moved toward and away from mandrel 19 by any suitable means (not shown). In addition, movement of mandrel 20 towards mandrel 19 may be under tension, and accomplished by spring loading (not shown) the opposite end of shaft 20b, all for a purpose to be described in detail below.

Figure 4:
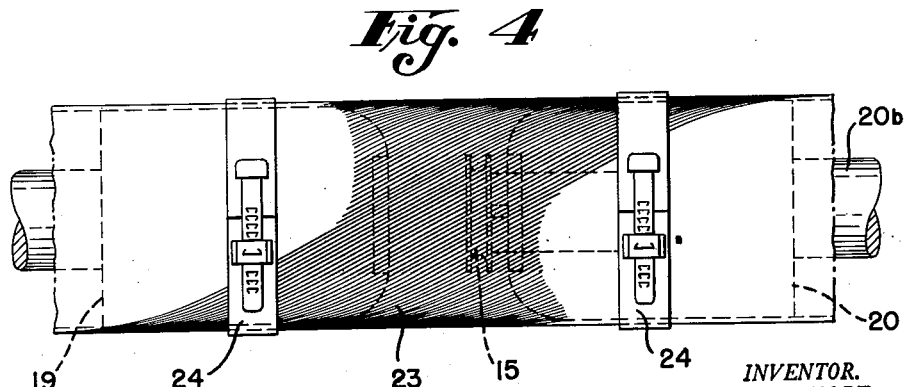
Fig. 4 is an elevation of the first step in the method of constructing the small bead portion of the preferred form of the invention.

Referring now particularly to Fig. 4, the pocket or tube 23 is shown therein as being mounted over the spaced mandrels 19 and 20, as well as disc 15. Prior to this, however, tube 23 is formed from a strip of substantially inextensible weftless or weakened weft cord fabric of the type used in the manufacture of pneumatic tire casings. The pocket or tube 23 may also be formed of a braided or knitted fabrics. The cords of the fabric may be of nylon, rayon, cotton, steel, glass, or other relatively inextensible but flexible material. The fabric is coated, covered or otherwise provided with flexible, resilient rubber, either natural or synthetic, or other suitable, flexible, or resilient plastic material which will render the fabric fluid-impermeable. The strip of cord fabric is then biascut and wrapped around a mandrel (not shown) in a generally helical path, with adjacent edges in abutting relationship, all of these operations being well known in the art. However, care is taken that the previously defined "cord angle" B (Fig. 2) lies within the range specified.

Tube 23 is then slipped over spaced mandrels 19 and 20 and secured thereon by means of hose type band clamps 24, as shown in Fig. 4. Next, as seen in Fig. 5, the spring loaded mandrel 20 is rotated the required amount and simultaneously moved toward mandrel 19 under tension. During these movements of mandrel 20, the portion of tube 23 intermediate its ends is twisted under longitudinal tension, and thereby contracted and flared arcuately inwardly, along the rounded mandrel ends 19a and 20a, into engagement with disc 15 between flanges 16 and 17. The tension on tube 23 eliminates overlapping of the fabric as it converges toward disc 15 and also provides a very satisfactory leak proof assembly of the cords between flanges 16 and 17, thereby eliminating the necessity of tying wire or cord around the fabric, in order to hold it in engagement with the disc.

For the preferred embodiment illustrated, the amount of twist ranges from approximately 100° to 150° with the "cord angle" of the fabric, being dependent on whether a flanged disc is necessary, and if so, the diameter of the disc used. In this connection, it is to be noted that these and other mechanical features of the invention, such as pin 18 on disc 15, the degree of curvature of mandrel ends 19a and 20a, and the size and shape of the sidewall and the larger end of the diaphragm, are designed to meet specific requirements of a given suspension device, and are therefore to be considered as merely illustrative of the invention, not as limitations thereon.

The next step in the preferred process, as shown in Fig. 6 is applying an axial compressive force to bump the ends of the mandrels together, in order to adhere the inherently tacky, adjacent surfaces of the twisted tube portion together. This is done by releasing mandrel 19 from its stationary position, and allowing it to be rapidly pulled or pushed toward the now stationary mandrel 20. During this bumping movement, disc 15 is received by recesses 22 in the mandrels. Fig. 7 illustrates the manner in which the cords forming ply 13 are twisted as the fabric merges into engagement with disc 15, it being obvious that the cords forming ply 14 are similarly twisted, but in the opposite direction.

Referring now to Figs. 2 and 6, the clamps 24 are removed, and the end of tube 23 forming one ply is folded in a continuous fold line down over the end forming the other ply to produce the tubular member 10, with the fold line being located circumferentially of disc 15 and between flanges 16 and 17. This may be accomplished in a variety of ways, but preferably by peeling one ply off its mandrel and down over the other ply on its mandrel and then removing tubular member 10 therefrom. Also, the twisted pocket or tube 23 and disc 15 may be removed from the mandrels and the plies 13 and 14 individually expanded and folded over to meet the requirements of a conically shaped diaphragm.

Diaphragm D is completed by forming large bead portion 11 and flaring the same outwardly, in any suitable, conventional manner. For example, tubular member 10 may be placed over a suitably shaped building form (not shown), and the relatively superimposed and substantially coextensive plies 13, 14 wrapped around a bundle of bead wires (not shown). After this, diaphragm D is placed in a mold (not shown) wherein it is molded and cured under heat and pressure, in accordance with standard practice.

Referring to Figs. 8, 9 and 10, they illustrate two modifications of the invention. In both cases, the method differs from the preferred method in that mandrel 20 is freely movable toward and away from mandrel 19 rather than being spring biased, as specified above.

As seen in Fig. 8, the first modification also employs disc 15. However, instead of rotating mandrel 20 to twist tube 23, a wire or cord 25 is wound around the tube, which gathers the fabric to the disc. In as much as tube 23 is not twisted and mandrel 20 is freely movable toward mandrel 19, there is little or no tension on the tube. Thus, this process produces overlapping or folding of the fabric in the direction of the "cord angle" as shown in Fig. 9. Compared to the preferred embodiment, such folding has certain disadvantages, in that the bead portion 12 is thicker, which makes it less flexible and increases the chance of deterioration at the start of each fold, because of flexing during use. However, diaphragms having relatively short folds, as shown in Figs. 8, 9 and 10, have been found to perform in a satisfactory manner.

Referring to Fig. 10, it illustrates another modification wherein a disc is not used. Instead, mandrel 20 is rotated to twist tube 23 more than in the preferred form of the invention. This method also produces folds in the fabric, which occur in the direction of twist, because of the lack of tension on tube 23 and the very small center opening, which is later closed by the flow of rubber during curing. A cord or wire may be used, as described above, to facilitate the twisting procedure, and to strengthen the small bead portion or end closure 12 when in use under fluid inflation pressure, by reducing inter-ply shear forces.

It will now be seen that this invention accomplishes its principal object of substantially increasing the performance of a fluid spring suspension, by increasing the effective stroke of the piston therein, through an increase in the effective reversible length of the diaphragm, which is brought about by making its smaller bead portion arbitrarily small with respect to the large bead portion thereof. Likewise, other objects and advantages of the invention have become apparent from the foregoing description and drawings.

While this invention has been described and illustrated by means of a certain preferred embodiment and modifications thereof, it is to be understood that various changes may be made therein by those skilled in the art, without departing from the invention, the scope of which it is to determined by the appended claims.

Having thus described our invention, what we claim and desire to protect by Letters Patent is:

1. In a method of making a generally tubular, flexible diaphragm having a larger end and a smaller end by superposing and adhering two plies of fabric coated with a flexible fluid-impermeable composition, the improvement comprising the steps of forming a single-ply cylindrical unit from said coated fabric, contracting the central portion of said cylindrical unit to thereby flare the same inwardly, drawing one end of the unit along the remainder thereof to a position over the other end of said unit thereby forming a continuous fold line at the center of said flared central portion and obtaining a generally tubular, flexible diaphragm having a larger end and a smaller end at said fold line and having two superposed, substantially coextensive plies of said coated fabric.

2. In a method of making a generally tubular, flexible diaphragm having a larger end and a smaller end be superposing and adhering two plies of fabric coated with a flexible fluid-impermeable composition, the improvement comprising the steps of forming a single-ply cylindrical unit from said coated fabric, twisting the central portion of said cylindrical unit to thereby contract and flare the same inwardly, drawing one end of the unit along the remainder thereof to a position over the other end of said unit thereby forming a continuous fold line at the center of said flared central portion and obtaining a generally tubular, flexible diaphragm having a larger end and a smaller end at said fold line and having two superposed, substantially coextensive plies of said coated fabric.

3. In a method of making a generally tubular, flexible diaphragm having a larger end and a smaller end by superposing and adhering two plies of fabric coated with a flexible fluid-impermeable composition, the improvement comprising the steps of forming a single-ply cylindrical unit from said coated fabric, twisting the central portion of said cylindrical unit under tension to thereby contract and flare the same inwardly, drawing one end of the unit along the remainder thereof to a position over the other end of said unit thereby forming a continuous fold line at the center of said flared central portion and obtaining a generally tubular, flexible diaphragm having a larger end and a smaller end at said fold line and having two superposed, substantially coextensive plies of said coated fabric.

4. In a method of making a generally tubular, flexible diaphragm having a larger end and a smaller end by superposing and adhering two plies of fabric coated with a flexible fluid-impermeable composition, the improvement comprising the steps of forming a single-ply cylindrical unit from said coated fabric, winding an elongated flexible member around the central portion of said cylindrical unit to thereby contract and flare the same inwardly, drawing one end of the unit along the remainder thereof to a position over the other end of said unit thereby forming a continuous fold line at the center of said flared central portion and obtaining a generally tubular, flexible diaphragm having a larger end and a smaller end at said fold line and having two superposed, substantially coextensive plies of said coated fabric.

5. In a method of making a generally tubular, flexible diaphragm having a larger end and a smaller end by superposing and adhering two plies of fabric coated with a flexible fluid-impermeable composition, the improvement comprising the steps of forming a single-ply cylindrical unit from said coated fabric, contracting the central portion of said cylindrical unit to thereby flare the same inwardly, expanding both end portions of said cylindrical unit to thereby flare the same outwardly, and thereafter superposing and adhering the outwardly flared end portions to obtain a generally tubular, flexible diaphragm having an outwardly flared larger end and an inwardly flared smaller end formed by a continuous fold line at the center of said inwardly flared central portion and having two superposed, substantially coextensive plies of said coated fabric.

6. In a method of making a generally tubular flexible diaphragm having a larger end and a smaller end by superposing and adhering two plies of fabric coated with a flexible fluid-impermeable composition, the improvement comprising the steps of forming a single-ply cylindrical unit from said coated fabric, contracting the central portion of said cylindrical unit to thereby flare the same inwardly into engagement with a disc provided with end flanges and having a diameter smaller than the diameter of said cylindrical unit, drawing one end of the unit along the remainder thereof to a position over the other end of said unit thereby forming a continuous fold line at the center of said flared central portion with said fold line being located circumferentially of said disc and between said flanges, and obtaining a generally tubular, flexible diaphragm having a larger end and a smaller end secured to said disc at said fold line and having two superposed, substantially coextensive plies of said coated fabric.

7. In a method of making a generally tubular, flexible diaphragm having a larger end and a smaller end by superposing and adhering two plies of bias-cut cord fabric formed of cord elements coated with a flexible fluid-impermeable composition, each of the cord elements of each ply extending from one end of said diaphragm to the other with the cord elements of one ply crossing those of the other ply, the improvement comprising the steps of helically winding said bias-cut cord fabric to form a single-ply cylindrical unit, twisting the central portion of said cylindrical unit to thereby contract and flare the same inwardly, drawing one end of the unit along the remainder thereof to a position over the other end of said unit thereby forming a continuous fold line at the center of said flared central portion and obtaining a generally tubular, flexible diaphragm having a larger end and a smaller end at said fold line and having two superposed, substantially coextensive plies of said coated cord fabric.

8. In a method of making a generally tubular, flexible diaphragm having a larger end and a smaller end by superposing and adhering two plies of bias-cut cord fabric formed of cord elements coated with a flexible fluid-impermeable composition, each of the cord elements of each ply extending from one end of said diaphragm to the other with the cord elements of one ply crossing those of the other ply, the improvement comprising the steps of helically winding said bias-cut cord fabric to form a single-ply cylindrical unit, twisting the central portion of said cylindrical unit under tension to thereby contract and flare the same inwardly, drawing one end of the unit along the remainder thereof to a position over the other end of said unit thereby forming a continuous fold line at the center of said flared central portion and obtaining a generally tubular, flexible diaphragm having a larger end and a smaller end at said fold line and having two superposed, substantially coextensive plies of said coated cord fabric.

9. In a method of making a generally tubular, flexible diaphragm having a larger end and a smaller end by superposing and adhering two plies of bias-cut cord fabric formed of cord elements coated with a flexible fluid-impermeable composition, each of the cord elements of each ply extending from one end of said diaphragm to the other with the cord elements of one ply crossing those of the other ply, the improvement comprising the steps of helically winding said bias-cut cord fabric to form a single-ply cylindrical unit, twisting the central portion of said cylindrical unit to thereby contract and flare the same inwardly into engagement with a disc provided with end flanges and having a diameter smaller than the diameter of said cylindrical unit, drawing one end of the unit along the remainder thereof to a position over the other end of said unit thereby forming a continuous fold line at the center of said flared central portion with said fold line being located circumferentially of said disc and between said flanges, and obtaining a generally tubular, flexible diaphragm having a larger end and a smaller end secured to said disc at said fold line and having two superposed, substantially coextensive plies of said coated cord fabric.

10. In a method of making a generally tubular, flexible diaphragm having a larger end and a smaller end by superposing and adhering two plies of bias-cut cord fabric formed of cord elements coated with a flexible fluid-impermeable composition, each of the cord elements of each ply extending from one end of said diaphragm to the other with the cord elements of one ply crossing those of the other ply, the improvement comprising the steps of helically winding said bias-cut cord fabric to form a single-ply cylindrical unit, twisting the central portion of said cylindrical unit to thereby contract and flare the same inwardly, expanding both end portions of said cylindrical unit to thereby flare the same outwardly, and thereafter superposing and adhering the outwardly flared end portions to obtain a generally tubular, flexible diaphragm having an outwardly flared larger end and an inwardly flared smaller end formed by a continuous fold line at the center of said inwardly flared central portion and having two superposed, substantially coextensive plies of said coated cord fabric.

11. In a method of making a generally tubular, flexible diaphragm having a larger end and a smaller end by superposing and adhering two plies of cord fabric formed of cord elements coated with a flexible fluid-impermeable composition, each of the cord elements of each ply extending from one end of said diaphragm to the other with the cord elements of one ply crossing those of the other ply, the improvement comprising the steps of forming a single-ply cylindrical unit from a single strip of said cord fabric with the cord elements of said fabric disposed at a cord angle of between 15° and 75°, mounting said cylindrical unit over a pair of axially aligned mandrels spaced on either side of a disc provided with end flanges and having a diameter smaller than the diameter of said cylindrical unit, rotating said mandrels relative to each other to twist the central portion of said cylindrical unit and thereby contract and flare the same inwardly into engagement with said disc, drawing one end of the unit along the remainder thereof to a position over the other end of said unit thereby forming a continuous fold line at the center of said flared central portion with said fold line being located circumferentially of said disc and between said flanges, and obtaining a generally tubular, flexible diaphragm having a larger end and a smaller end secured to said disc at said fold line and having two superposed, substantially coextensive plies of said coated cord fabric.

12. In a method of making a generally tubular, flexible diaphragm having a larger end and a smaller end by superposing and adhering two plies of bias-cut cord fabric formed of cord elements coated with a flexible fluid-impermeable composition, each of the cord elements of each ply extending from one end of said diaphragm to the other with the cord elements of one ply crossing those of the other ply, the improvement comprising the steps of helically winding said bias-cut cord fabric to form a single-ply cylindrical unit, mounting said cylindrical unit over a pair of axially aligned mandrels spaced on either side of a disc provided with end flanges and having a diameter smaller than the diameter of said cylindrical unit, rotating said mandrels relative to each other to twist the central portion of said cylindrical unit and thereby contract and flare the same inwardly into engagement with said disc, expanding both end portions of said cylindrical unit to thereby flare the same outwardly, and thereafter superposing and adhering the outwardly flared end portions to obtain a generally tubular, flexible diaphragm having an outwardly flared larger end and an inwardly flared smaller end secured to said disc at a continuous fold line formed at the center of said inwardly flared central portion, said fold line being located circumferentially of said disc and between said flanges, and having two superposed, substantially coextensive plies of said coated cord fabric.

13. In a method of making a generally tubular, flexible diaphragm having a larger end and a smaller end by superposing and adhering two plies of bias-cut cord fabric formed of cord elements coated with a flexible fluid-impermeable composition, each of the cord elements of each ply extending from one end of said diaphragm to the other with the cord elements of one ply crossing those of the other ply, the improvement comprising the steps of helically winding said bias-cut cord fabrics to form a single-ply cylindrical unit, mounting said cylindrical unit over a pair of axially aligned mandrels spaced on either side of a disc provided with end flanges and having a diameter smaller than the diameter of said cylindrical unit, simultaneously rotating said mandrels relative to each other to twist the central portion of said cylindrical unit and moving said mandreds relative towards each other under tension to maintain said central portion under tension thereby contracting and flaring the same inwardly into engagement with said disc, drawing one end of the unit along the remainder thereof to a position over the other end of said unit thereby forming a continuous fold line at the center of said flared central portion with said fold line being located circumferentially of said disc and between said flanges, and obtaining a generally tubular flexible diaphragm havng a larger end and a smaller end secured to said disc at said fold line and having two superposed, substantially coextensive plies of said coated cord fabric.

14. In a method of making a generally tubular, flexible diaphragm having a larger end and a smaller end by superposing and adhering two plies of cord fabric formed of cord elements coated with a flexible fluid-impermeable composition, each of the cord elements of each ply extending from one end of said diaphragm to the other with the cord elements of the one ply crossing those of the other ply, the improvement comprising the steps of forming a single ply cylindrical unit from a single strip of said cord fabric with the cord elements of said fabric disposed at a cord angle of between 15° and 75°, mounting said cylindrical unit over a pair of axially aligned mandrels spaced on either side of a disc provided with end flanges and having a diameter smaller than the diameter of said cylindrical unit, simultaneously rotating said mandrels relative to each other to twist the central portion of said cylindrical unit and moving said mandrels relative towards each other under tension to maintain said central portion under tension thereby contracting and flaring the same inwardly into engagement with said disc, applying an axial compressive force to said mandrels to adhere the adjacent surfaces of said central portion together, drawing one end of the unit along the remainder thereof to a position over the other end of said unit thereby forming a continuous fold line at the center of said flared central portion with said fold line being located circumferentially of said disc and between said flanges, and obtaining a generally tubular, flexible diaphragm having a larger end and a smaller end secured to said disc at said fold line and having two superposed, substantially coextensive plies of said coated cord fabric.

References Cited in the file of this patent

UNITED STATES PATENTS

| | | |
|---|---|---|
| 2,033,354 | Pennington | Mar. 10, 1936 |
| 2,037,666 | Pennington | Apr. 14, 1936 |
| 2,178,953 | Chilton | Nov. 7, 1939 |